(12) United States Patent
Ramasamy et al.

(10) Patent No.: US 12,163,092 B2
(45) Date of Patent: Dec. 10, 2024

(54) POLYHEDRAL OLIGOMERIC SILSESQUIOXANE AS RHEOLOGY BOOSTER FOR INVERT EMULSION OIL-BASED MUD

(71) Applicant: SAUDI ARABIAN OIL COMPANY, Dhahran (SA)

(72) Inventors: Jothibasu Ramasamy, Dhahran (SA); Vikrant Wagle, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 71 days.

(21) Appl. No.: 17/490,294

(22) Filed: Sep. 30, 2021

(65) Prior Publication Data

US 2023/0104120 A1  Apr. 6, 2023

(51) Int. Cl.
*E21B 43/12* (2006.01)
*C09K 8/36* (2006.01)

(52) U.S. Cl.
CPC ............ *C09K 8/36* (2013.01); *E21B 43/12* (2013.01); *C09K 2208/28* (2013.01)

(58) Field of Classification Search
CPC ........ C09K 8/36; C09K 2208/28; E21B 43/12
USPC ...................................... 166/305.1
See application file for complete search history.

(56) References Cited

U.S. PATENT DOCUMENTS 4,421,656 A * 12/1983 Donatelli ............... C08L 83/12
507/926
5,102,560 A * 4/1992 Davis .................... E21B 43/164
166/275
9,127,192 B2     9/2015 Maghrabi et al.
2013/0303410 A1* 11/2013 Wagle ..................... C09K 8/36
507/128
2016/0208157 A1     7/2016 Vo et al.
2016/0312105 A1* 10/2016 Vo .......................... E21B 43/267
(Continued)

FOREIGN PATENT DOCUMENTS

CN        105754563 B     8/2018
RU        2001107412 A    2/2003
(Continued)

OTHER PUBLICATIONS

Masalova, Irina, et al., "Stabilisation of highly concentrated water-in-oil emulsions by polyhedral oligomeric silsesquioxane nanomolecules", Journal of Molecular Liquids, ScienceDirect, Elsevier B.V., vol. 279, pp. 351-360, Jan. 2019 (10 pages).
(Continued)

*Primary Examiner* — Zakiya W Bates
*Assistant Examiner* — Ashish K Varma
(74) *Attorney, Agent, or Firm* — Osha Bergman Watanabe & Burton LLP (57) ABSTRACT

A composition of an invert emulsion oil-based drilling fluid is provided. The composition may include an oil phase and an aqueous phase. The oil phase may include an oleaginous fluid, an organophilic clay-based solid viscosifier, and a liquid viscosifier including a POSS. Further provided is a method of introducing the composition including the POSS into a wellbore. After introduction of the composition into the wellbore, the method includes maintaining wellbore conditions to provide a stable rheological property for a period up to about 96 hours in an HPHT section of a wellbore.

19 Claims, 3 Drawing Sheets

(56) References Cited

U.S. PATENT DOCUMENTS

2016/0376492 A1* 12/2016 Chakraborty ............ C09K 8/58
  166/267
2019/0225875 A1*  7/2019 Singh ...................... E21B 43/26

FOREIGN PATENT DOCUMENTS

| WO | 2018022693 A1 | 2/2018 |
| WO | 2020097489 A1 | 5/2020 |

OTHER PUBLICATIONS

Nelson, M.D., et al., "Abstract: Development and Application of a Water-in-oil Emulsion Drilling Mud", API-55-235, Drilling and Production Practice, API, Jan. 1955, Date Accessed: Feb. 24, 2022, URL: <https://search.spe.org/i2kweb/SPE/doc/onepetro:E5471320> (2 pages).

* cited by examiner

FIG. 3A

POLYHEDRAL OLIGOMERIC SILSESQUIOXANE AS RHEOLOGY BOOSTER FOR INVERT EMULSION OIL-BASED MUD

BACKGROUND

Drilling fluid including oil-based fluids, synthetic-based fluids, or water-based fluids may be introduced downhole when drilling a high pressure, high temperature (HPHT) section of a well. An HPHT well may have a temperature greater than 150 degrees Celsius (° C.) and a pressure that may exceed 10,000 pounds per square inch (psi). Under these conditions, oil-based and synthetic-based drilling fluids may thin out, whereas water-based fluids may thicken or gel.

Thus, invert emulsion drilling fluids may be introduced in HPHT sections of a well to maintain a desired rheology, without the thinning of oil-based and synthetic-based fluids, or the thickening of water-based fluids. An invert emulsion is an oil-based emulsion of an oil phase and an aqueous phase known as a water-in-oil emulsion. When an invert emulsion is provided as a drilling fluid, clays and active solids may be maintained in a deflocculated state in the well.

SUMMARY

This Summary is provided to introduce a selection of concepts that are further described in the Detailed Description. This summary is not intended to identify key or essential features of the claimed subject matter, nor is it intended to be used as an aid in limiting the scope of the claimed subject matter.

In one aspect, embodiments disclosed herein are directed to a composition of an invert emulsion oil-based drilling fluid. The composition may include an invert emulsion of an oil phase and an aqueous phase. The oil phase may include an oleaginous fluid, a solid viscosifier that is an organophilic clay-based viscosifier, and a liquid viscosifier that is a polyhedral oligomeric silsesquioxane (POSS).

In another aspect, embodiments disclosed herein are directed to a method of introducing a drilling fluid into a wellbore. The method may include introducing an invert emulsion oil-based drilling fluid formulation that includes an oil phase, an aqueous phase, a solid viscosifier, and a liquid viscosifier including POSS downhole in the wellbore. The method may include maintaining wellbore conditions such that the invert emulsion oil-based drilling fluid formulation provides a stable rheological property including one or more of viscosity, yield point, plastic viscosity, gel strength, and electrical stability for a period up to about 96 hours. The method may include introducing a drilling fluid into the wellbore, where the wellbore conditions include one or more HPHT section including a pressure of greater than or equal to 10,000 psi, a temperature of greater than or equal to 150° C., or the pressure of greater than or equal to 10,000 psi and the temperature of greater than or equal to 150° C., and where the stable rheological property may include a low shear rate measured at 3 rpm and 6 rpm.

Other aspects and advantages of the claimed subject matter will be apparent from the following description and the appended claims.

BRIEF DESCRIPTION OF DRAWINGS

This section describes one or more embodiments in detail with reference to the accompanying figures.

DETAILED DESCRIPTION

In the following Detailed Description, numerous details provide a thorough understanding of the disclosure. However, one of ordinary skill in the art will find that the disclosure may be practiced without these details. Moreover, one or more well-known features are briefly detailed to avoid unnecessarily complicating the description. As used herein, fluids may refer to slurries, liquids, gases, or mixtures thereof. One or more embodiments are described merely as examples of useful applications, which are not limited to any specific details of the one or more embodiments herein.

One or more embodiments in accordance with the present disclosure generally relate to a drilling fluid ("mud") including polyhedral oligomeric silsesquioxane (POSS) as a rheology modifier (also known as a viscosifier). One or more embodiments relate to invert emulsion oil-based drilling fluid formulation including POSS, and related methods that can improve yield point, low shear rheology, and electrical stability of these drilling fluids, among other things. "Low shear" means a shear rate measured at 3 rpm and 6 rpm as known to those of ordinary skill in the art. For example, a shear rate at 3 rpm and 6 rpm may be measured by using a FANN® model 35 viscometer.

In particular, when drilling formations at "HPHT" (high pressure, high temperature) conditions, such as a shale section of a formation at HPHT, an invert emulsion (water-in-oil or W/O emulsion) oil-based drilling fluid may be used to stabilize the reactive formation. "HPHT" or "high pressure/high temperature" in describing wellbore conditions may include a pressure of greater than or equal to 10,000 psi, a bottomhole or a section temperature of greater than or equal to 250° F., or a combination of both. The invert emulsion oil-based drilling fluid may include a conventional viscosifier. The conventional viscosifier may include solids in a mixture with a liquid or may be a solid. The solid or solids may include but are not limited to clay and silica.

Conventional viscosifiers may be added to a drilling fluid to provide a desired rheological property for drilling operations. However, conventional viscosifiers may contain a high content of solids. When this high content of solids is added to the drilling fluid, formation or equipment damage may result. A high content of solids also contributes to a higher circulating density than a low content of solids.

In addition, a conventional viscosifier under HPHT conditions may not maintain a desired rheological property when added to a drilling fluid. Failure to maintain a desired rheological property may result in solids settling, barite sagging, and cuttings build up within the drilling fluid or wellbore. A "desired rheological property" includes improved low shear rheology, according to one or more embodiments of the present disclosure (such as improved low shear rheology when using a composition with a POSS compared to low shear rheology when using a composition without a POSS). Low shear rheology may include one or more rheological property according to one or more embodiments of the present disclosure, especially in high density muds. As used herein, "low shear rheology" refers to a property of the mud when the agitation or shear rate is low, for example, as measured by using a FANN® model 35 viscometer at 3 or 6 RPM. As may be appreciated by those skilled in the art, while the low shear rheological properties are described in detail in the present disclosure, improvements in rheological properties at higher shear rates may also be achieved by the compositions disclosed herein.

An improved low shear rheology may include having a viscosity of from 0.1 to 50 centipoise (cP) (at 6 rpm) and a viscosity of from 0.05 to 25 cP (at 3 rpm). In addition, low shear rheology may include a yield point in a range from 1 to 100 pounds per hundred square feet (lb/100 ft$^2$); a plastic viscosity in a range from 20 to 150 cP; a 10 second (sec.) gel strength may be in a range from 0.1 to 30 lb/100 ft$^2$; a 10 minute (min.) gel strength in a range from 0.1 to 50 lb/100 ft$^2$; and an electrical stability in a range from 100 to 700 volts.

One or more embodiments of the present disclosure describe an invert emulsion oil-based drilling fluid formulation including a POSS and a conventional viscosifier.

When the POSS and the conventional viscosifier are combined together in an invert emulsion oil-based drilling fluid formulation, loadings of the conventional viscosifier may be reduced compared to a drilling fluid without the POSS. In such a combination, a desired rheological property of the drilling fluid may be advantageously improved while maintaining the solids content of the drilling fluid. Further, in such a combination, a desired rheological property of the drilling fluid may be advantageously maintained while lowering the solids content of the drilling fluid. In these instances, the POSS may act as a rheology booster to improve rheological properties of the conventional viscosifier or to compensate reduced loadings of the conventional viscosifier. Further, when the POSS and the conventional viscosifier are combined in an invert emulsion oil-based drilling fluid formulation, the drilling fluid may not include a dispersing agent. Advantageously, the aforementioned combination allows an effective dispersion in the absence of a dispersing agent.

Composition: Invert Emulsion Oil-Based Drilling Fluid Formulation

In one or more embodiments, the composition includes an invert emulsion oil-based drilling fluid formulation includes a POSS and a conventional viscosifier.

An invert emulsion oil-based drilling fluid formulation may comprise an oil phase including an oleaginous fluid such as crude oil, condensates, light hydrocarbon liquids, fractions thereof, derivatives thereof, and others. In one or more embodiments, the oil phase may include a dearomatized mineral oil. An example of a dearomatized mineral oil is Safra oil (SaudiSol, Gulf Chemicals and Industrial Oils Co., Saudi Arabia). In one or more embodiments, Safra oil ranges from 60 to 95 vol % of the overall composition volume (volume expressed in barrels).

An invert emulsion oil-based drilling fluid formulation includes an inverted phase, called an aqueous phase. The water of the aqueous phase may be any form of water, including, but not limited to, deionized water; filtered or raw fresh waters; mineral waters; filtered, raw or synthetic seawater; brackish water; synthetic or natural brines; salt water; formation water; and produced water. The water may contain an amount of organics from natural or artificial sources as long as the function of the composition, which is to provide the invert emulsion, is not inhibited. The water may contain an amount of minerals or metals from natural or artificial sources as long as the function of the composition is not inhibited. The water may contain an amount of monovalent ions, multivalent ions, and combinations thereof.

In one or more embodiments, the aqueous phase is a brine, such as a calcium chloride anhydride-based brine. The brine may be in a range of 5 to 40 vol % compared to the total volume of the drilling fluid formulation.

An invert emulsion oil-based drilling fluid formulation may include a conventional viscosifier that is a solid viscosifier. As used herein, a "solid viscosifier" may be a solid or a mixture of a solid with a liquid. If in the form of a mixture of a solid with a liquid, the mixture may be a suspension of the solid in the liquid. The solid viscosifier may be an organophilic clay-based viscosifier that may further include silica, for example, crystalline silica (quartz). A content of silica in the solid viscosifier may be about 1 to 20 weight percent (wt %), such as 1 to 15 wt %, 1 to 10 wt %, and 1 to 5 wt %, compared to the total weight of the solid viscosifier.

The solid viscosifier may also include an amine. The amine includes or consists of a tri-alkyl amine, for example, bis(hydrogenated tallow alkyl)methylamine. A content of amine in the solid viscosifier may be about 0 to 1 wt %, for example, a non-zero value up to about 1 wt %, or a non-zero value up to 1 wt % of the total weight of the solid viscosifier. The solid viscosifier may be, for example, GELTONE® II (Halliburton, USA), produced by Halliburton, USA. The solid viscosifier may have a specific gravity of from 1 to 5, such as from 1 to 4, 1 to 3, 1 to 2, 1.5 to 2, and 1.6 to 1.8.

As previously mentioned, the invert emulsion oil-based drilling fluid formulation may include a POSS. In one or more embodiments, the POSS is a liquid viscosifier. The POSS has an inorganic silicate (silsesquioxane) core, including Si—O—Si linkages.

The POSS can have the average unit formula [R$^1$SiO$_{1.5}$], where one or more R$^1$SiO$_{1.5}$ unit in the POSS includes an R group ("R$^1$"). The repeating unit of the POSS can have the structure:

(Formula I)

where silicon-bonded oxygen is bonded to another silicon atom, a hydrogen atom (for example, silanol), or to an independently selected R$^1$ as will be defined. The POSS can have a total number of [R$^1$SiO$_{1.5}$] units selected from the group consisting of 6, 8, 10, and 12 and thus a corresponding number of R groups. In one or more embodiments, the POSS has 8 [$R^1SiO_{1.5}$] units. The POSS can be any suitable POSS. The POSS can be a partially or fully caged. In one or more embodiments, the POSS is fully caged, that is, the tetrahedral vertex of the POSS (polyhedron) can be occupied by a silicon atom, and the edge of the polyhedron can be formed by an Si—O unit or repeating units of Si and O, including Si—O—Si.

The POSS can include three or more sides, with the three or more sides having a different plane, and with the three or more sides defined as interconnected $R^1SiO_{1.5}$ units, having the structure:

(Formula II)

In one or more embodiments, the POSS epoxy resin has six sides like that of a cube and is therefore "fully caged".

The POSS includes one or more different compositions of POSS. In one or more embodiments, the POSS can have a structure:

(Formula III)

Figure 1:
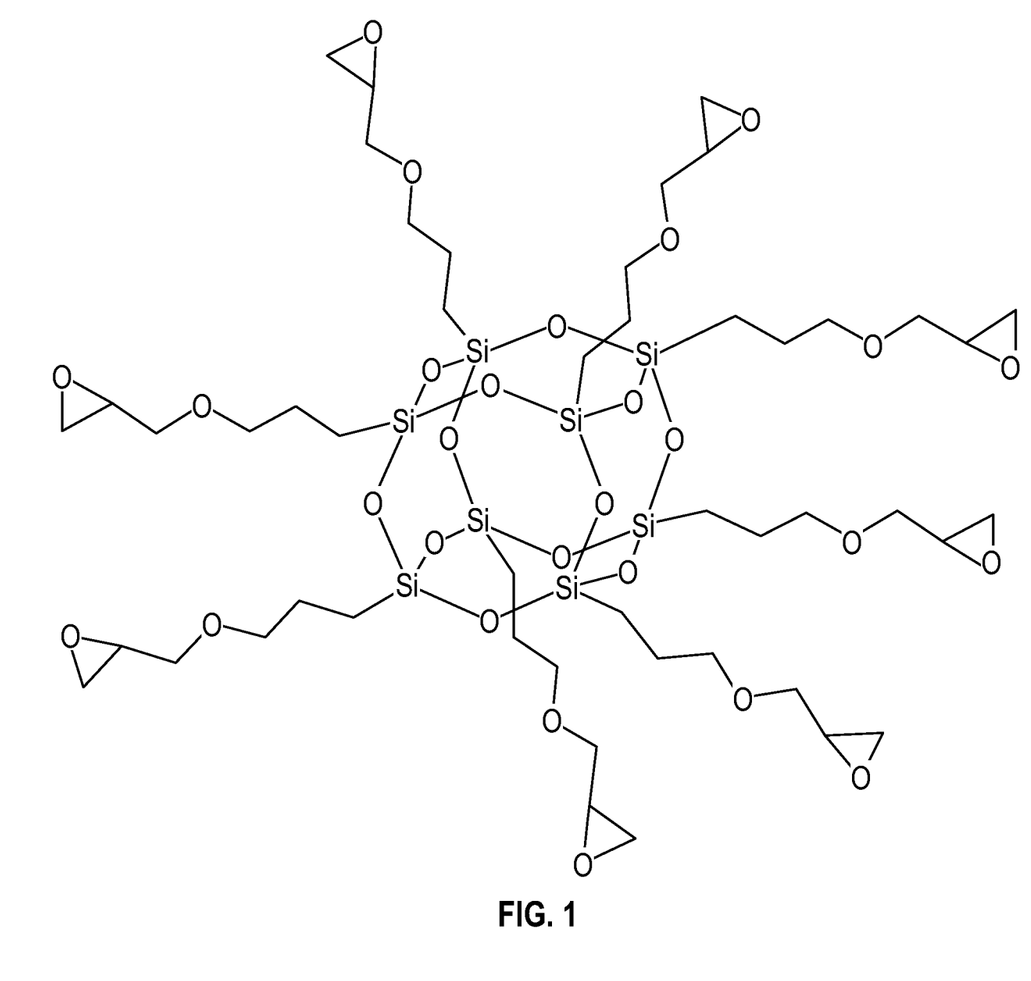
FIG. 1 depicts a structural formula of a glycidyl POSS, according to one or more embodiments.

In one or more embodiments, the POSS is a glycidyl POSS. A glycidyl POSS is shown in FIG. 1 as a first-generation dendrimer. Glycidyl POSS includes a silsesquioxane core as a cage. An organic substituent (R group, or $R^1$) attaches to a silica atom at one or more tetrahedral vertex of the cage. In one or more embodiments, the $R^1$ groups for the POSS are the same. An organosilicon bond (Si—C) binds the organic substituent to the POSS. In one or more embodiments, the organic substituent is a glycidyl functional group having formula R—$CH_2$—$CH_2$—$CH_2$—O—$CH_2$—$C_2H_3O$ bound to the tetrahedral vertices of the cage. "—$C_2H_3O$" is a terminal epoxide. The glycidyl functional group is otherwise known as an n-propyl glycidyl ether that is functionalized at the n-propyl terminus. In one or more embodiments, the glycidyl POSS is a liquid. Glycidyl POSS (CAS number 68611-45-0) is produced by Hybrid Plastics, USA.

The POSS may be included in a concentration of 0.1 to 10 pounds per barrel in the drilling fluid formulation.

In one or more embodiments, the ratio of a conventional viscosifier to POSS in the formulation may be from 1:1 to 1:20, such as from 1:1 to 1:10, or from 1:1 to 1:5.

In one or more embodiments, an invert emulsion oil-based drilling fluid formulation may comprise one or more additives. The additive may include but is not limited to a weighting agent, a friction reducer, a filtration control agent, an emulsion activator, a primary emulsifier, a secondary emulsifier, and combinations thereof. Such additives and combinations thereof are known in the art.

A weighting agent refers to finely divided solid material that is used to increase the density of the invert emulsion oil-based drilling fluid formulation. Non-limiting examples of weighting agents include aragonite, bentonite, barite, barium chloride, barium hydroxide, barium oxide, barium sulfate, calcite, calcium carbonate, dolomite, hematite, ilmenite, iron carbonate, iron oxides, lead carbonate, manganese oxides, siderite, zinc carbonate, zinc oxide, zirconium oxide, and other various minerals. In one or more embodiments, the additive includes barite or manganese tetroxide as a weighting agent.

In one or more embodiments, the weighting agent is provided in a concentration range of from 0.5 to 300 parts per billion (ppb) in the overall composition.

A filtration control agent that may be added in the invert emulsion oil-based drilling fluid formulation may include but is not limited to modified lignites, asphalts, gilsonites, polymeric fluids, and combinations thereof. In one or more embodiments, the additive includes VERSATROL® (Schlumberger, USA) as a filtration control agent.

In one or more embodiments, the filtration control agent is provided in a concentration range of from 0.1 to 20 ppb.

An emulsion activator refers to a component that activates the emulsifier, which then stabilizes the emulsion and aids in the formation of the invert emulsion. The emulsion activator may include but is not limited to a lime-based activator.

In one or more embodiments, the primary emulsifier is basic (pH greater than 7.0, a "basic emulsifier"). In one or more embodiments, the primary emulsifier is a blend of fatty acid and hydrocarbons, such as VERSAMUL® (Schlumberger, USA). The hydrocarbon blend may include mineral oil, petroleum distillates, and raffinates. The primary emulsifier is added to an invert emulsion oil-based drilling fluid (mud) formulation to emulsify water in oil and to uniformly distribute water droplets. One of ordinary skill in the art will appreciate other known examples of (primary or secondary) emulsifiers. The primary emulsifier concentration is 0.1 to 30 ppb of the total composition.

An emulsifier may be a component used in producing an oil-based or synthetic oil-based drilling fluid that forms an invert emulsion. An emulsifier may lower the interfacial tension between oil and water. For example, emulsifiers may be a primary emulsifier or a secondary emulsifier, where the secondary emulsifier may be used alone or in combination with another emulsifier in producing an invert emulsion. Emulsifiers may include calcium fatty-acid soaps made from various fatty acids, and/or derivatives such as amides, amines, amidoamines and imidazolines made by reactions of fatty acids, and various ethanolamine compounds.

In one or more embodiments, the secondary emulsifier is VERSACOAT® (Schlumberger, USA). The secondary emulsifier concentration is 0.1 to 30 ppb of the total composition.

Method

One or more embodiments of the present disclosure describe a method of introducing an invert emulsion oil-based drilling fluid formulation into a wellbore.

The formulation according to one or more embodiments is mixed before introducing into a wellbore as shown in Table 1. The invert emulsion oil-based drilling fluid formulation may be stored for up to one week in a laboratory setting and a longer time period in the field. The invert emulsion oil-based drilling fluid formulation may also be recycled for reuse.

The formulation is then introduced into a wellbore where one or more section thereof may be at HPHT conditions ("HPHT section"). Wellbore conditions are maintained for a period. The period may be up to about 96 hours, about 72 hours, about 48 hours, about 24 hours, about 20 hours, about 18 hours, and about 16 hours. "Maintaining wellbore conditions" relating to drilling fluid means that drilling operations may proceed, stop, or stop and resume. In this instance, drilling operations may include but are not limited to pumping, circulating, pressurizing, depressurizing, drilling, removing cuttings, sealing, cooling, lubricating, transmitting energy (hydraulic and otherwise), maintaining wellbore stability, and other techniques known in the art.

While maintaining wellbore conditions, the formulation provides a rheological property of the invert emulsion oil-based drilling fluid that may be stable for the duration of the previously described step where wellbore conditions are maintained. The rheological property of the drilling fluid may include but is not limited to viscosity at one or more shear rate, yield point ("YP"), plastic viscosity ("PV"), gel strength, electrical stability, and combinations thereof. The time period that the formulation will maintain the rheological property of the drilling fluid is 12-24 hours or more. An invert emulsion mud may be stable for a period of days, where stability relates to maintaining the rheological property of the drilling fluid.

For example, a viscosity relative to a shear rate may be from 20 to 300 centipoise (cP) at 600 rpm, from 20 to 250 cP at 300 rpm, from 10 to 200 cP at 200 rpm, from 5 to 150 cP at 100 rpm, from 0.1 to 50 cP at 6 rpm, and from 0.05 to 25 cP at 3 rpm.

In addition, a yield point may be in a range from 1 to 100 pounds per hundred square feet (lb/100 ft$^2$). A plastic viscosity may be in a range from 20 to 150 cP. A 10 second (sec.) gel strength may be in a range from 0.1 to 30 lb/100 ft$^2$. A 10-minute (min.) gel strength may be in a range from 0.1 to 50 lb/100 ft$^2$. An electrical stability may be in a range from 100 to 700 volts.

Methods and procedures to measure viscosity at one or more shear rate, yield point, plastic viscosity, gel strength, and electrical stability are commonly known in the art.

Examples

Several formulations according to one or more embodiments were prepared, as shown in Table 1. The total solids content (%) in formulation 1 to 4 is from 15 to 20%.

TABLE 1

Formulations with and without POSS, Examples and Comparative Examples (CE).

| Component | Detail | Formulation 1, CE1 | Formulation 2, Example 1 | Formulation 3, CE2 | Formulation 4, Example 2 | Vol-% of total volume % | Mixing time (mins) |
|---|---|---|---|---|---|---|---|
| Oil phase | Safra oil | 161.3 milliliters (mL) | 161.3 mL | 161.3 mL | 161.3 mL | 50.2% | — |
| Primary emulsifier | VERSAMUL ® | 8 mL | 8 mL | 8 mL | 8 mL | 2.5% | 5 |
| Secondary emulsifier | VERSACOAT ® | 4 mL | 4 mL | 4 mL | 4 mL | 1.25% | 5 |
| Emulsion activator | Lime | 6 g | 6 g | 6 g | 6 g | 0.84% | 20 |
| Solid viscosifier | GELTONE ® II | 4 grams (g) | 4 g | 1 g | 1 g | 0.78% | 5 |
| Liquid viscosifier | POSS (1.25 g/mL density) | 0 mL | 3 mL | 0 mL | 3 mL | 0.93% | 5 |
| Filtration control agent | VERSATROL ® | 6 g | 6 g | 6 g | 6 g | 1.78% | 20 |
| Inverted phase | Brine (DI water 50.65 mL + CaCl$_2$ anhydrous 21.25 g) | 63 mL | 63 mL | 63 mL | 63 mL | 19.6% | 5 |
| Weighting agent | Barite | 280 g | 280 g | 280 g | 280 g | 19.6% | 5 |
| Friction reducer | REV DUST ™ | 20 g | 20 g | 20 g | 20 g | 2.5% | 20 |

Formulations 1 to 4 were mixed and hot rolled at about 176° C. (350° F.) and 500 psi for 16 hours. This temperature and pressure simulates HPHT conditions. A benchtop mixer at 11500 revolutions per minute (rpm) was used for the mixing.

After subjecting the formulations to HPHT conditions, the formulations were cooled to about 48° C. (120° F.). Next, rheological measurements were taken and are shown in Table 2.

TABLE 2

Rheological properties of formulations.

| | Formulation 1, CE1 | Formulation 2, Example 1 | Formulation 3, CE2 | Formulation 4, Example 2 |
|---|---|---|---|---|
| 600 rpm reading | 120 | 256 | 73 | 117.2 |
| 300 rpm reading | 70 | 158 | 38.2 | 66.3 |
| 200 rpm reading | 40 | 117 | 25.7 | 47.3 |
| 100 rpm reading | 22 | 68 | 13.5 | 26.2 |
| 6 rpm reading | 4 | 5.8 | 1 | 1.8 |
| 3 rpm reading | 3 | 3.2 | 0.7 | 1.2 |
| PV (plastic viscosity) | 50 | 98.7 | 34.9 | 53.2 |
| YP (yield point) | 20 | 56.4 | 2.8 | 13.3 |
| 10 sec. gel strength | 4 | 2.9 | 0.4 | 0.6 |
| 10 min. gel strength | 9 | 2.7 | 0.3 | 1 |
| Electrical stability | 395 | 545 | 202 | 432 |

FIGS. 2A-2C and 3A-3C depict data from Table 2, show the change in yield point, low shear rheology, and electrical stability of the formulations with and without glycidyl POSS.

Figure 2A:
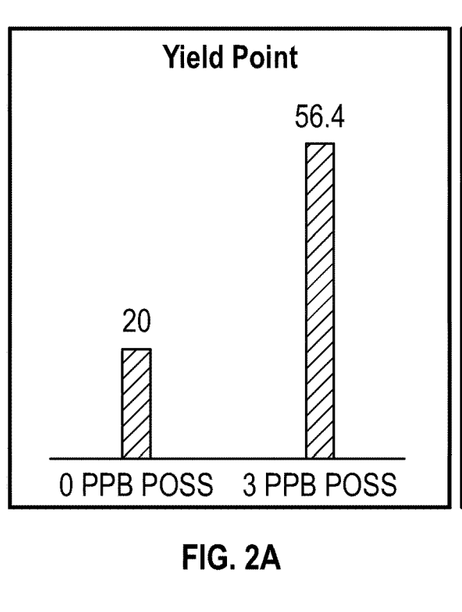
FIG. 2A shows yield point of CE1 (formulation 1) and Example 1 (formulation 2) in graphical format, according to one or more embodiments.
Figure 2B:
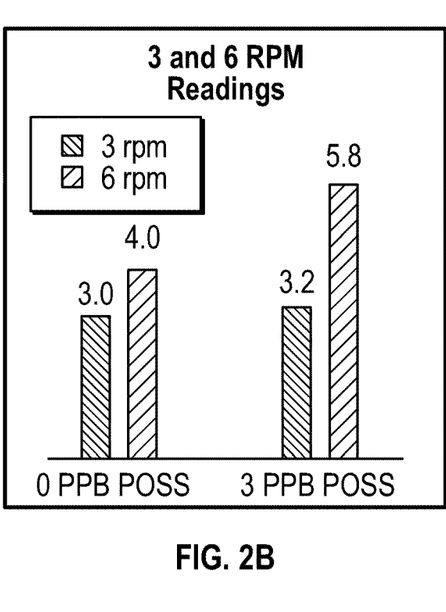
FIG. 2B shows low shear rheology (viscosity) of CE1 (formulation 1) and Example 1 (formulation 2) in graphical format, according to one or more embodiments.
Figure 2C:
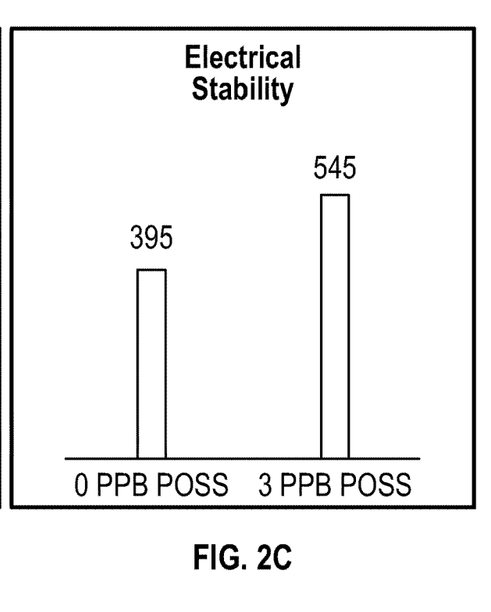
FIG. 2C shows electrical stability of CE1 (formulation 1) and Example 1 (formulation 2) in graphical format, according to one or more embodiments.

Comparative Example 1 (CE1) (formulation 1) and Example 1 (formulation 2) both include 4 grams of solid viscosifier (GELTONE® II) (Table 1) and are used to compare formulations with and without glycidyl POSS. The YP increased from 20 to 50.4 lb/100 ft$^2$ with the addition of a liquid viscosifier (glycidyl POSS) in Example 1 compared to CE1 without a liquid viscosifier (FIG. 2A). Likewise, the low shear rheology readings (at 3 rpm and 6 rpm) and electrical stability increased with the addition of liquid viscosifier in Example 1 compared to CE1 without a liquid viscosifier (FIGS. 2B and 2C). Thus, the rheological properties of Example 1 improve compared to CE 1, without increasing a solids content.

Comparative Example 2 (CE2) (formulation 3) and Example 2 (formulation 4) reduce a solids content by lowering the amount of solid viscosifier (GELTONE® II) by 75% (from 4 grams in Example 1 and CE1 to 1 gram in Example 2 and CE2, Table 1). As an amount of solid viscosifier is reduced, the rheological properties also decrease (Table 2, CE2 compared to CE1).

Glycidyl POSS is included in Example 2 as a liquid viscosifier to boost rheological properties where an amount of solid viscosifier is reduced by 75%, for example, CE1 (Table 1).

Even with a reduced amount of solid viscosifier content, Example 2 provides increased PV and electrical stability compared to CE1, while retaining similar rheological properties (Table 2). Thus, the addition of glycidyl POSS in Example 2 provides similar and improved rheological properties compared to CE1, while reducing a solid viscosifier amount by 75% and associated solid content.

Figure 3A:
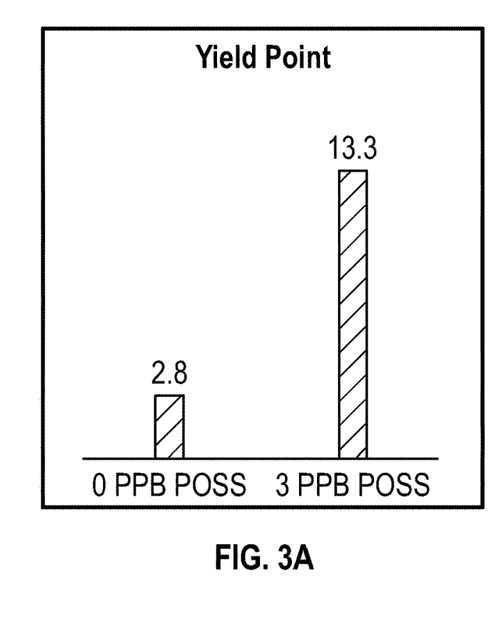
FIG. 3A shows yield point of CE2 (formulation 3) and Example 2 (formulation 4) in graphical format, according to one or more embodiments.
Figure 3B:
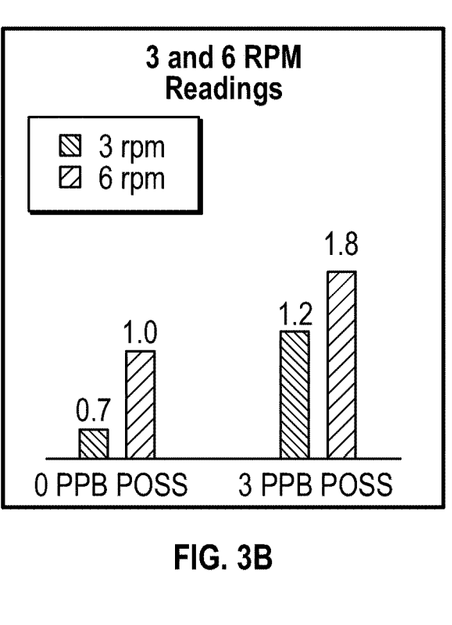
FIG. 3B shows low shear rheology of CE2 (formulation 3) and Example 2 (formulation 4) in graphical format, according to one or more embodiments.
Figure 3C:
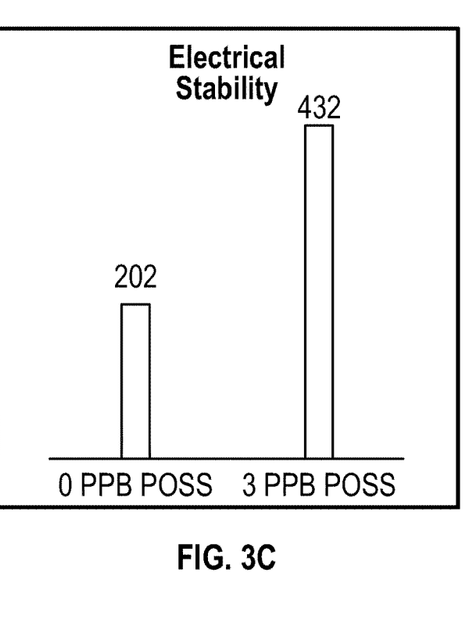
FIG. 3C shows electrical stability of CE2 (formulation 3) and Example 2 (formulation 4) in graphical format, according to one or more embodiments.

Example 2 and CE2, including 1 gram of solid viscosifier (GELTONE® II) (Table 1), are used to compare reduced solids content with and without glycidyl POSS. The YP increased from 2.8 to 13.3 lb/100 ft$^2$ with the addition of glycidyl POSS in Example 2 compared to without glycidyl POSS in CE2 (FIG. 3A). Likewise, low shear rheology readings (at 3 rpm and 6 rpm) and electrical stability increased with the addition of glycidyl POSS in Example 2 compared to without glycidyl POSS in CE2 (FIGS. 3B and 3C).

Accordingly, improved rheological properties have been observed for drilling fluid formulations including a glycidyl POSS and a conventional viscosifier as compared to the same formulations without glycidyl POSS. Further, drilling fluid formulations with low loadings of glycidyl POSS, from 0.1 to 1 ppb, or about 0.5 ppb, provide similar and improved rheological properties when reducing an amount of a solids-containing viscosifier up to 75%.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially", when used, refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function, not limited to structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A method of introducing a drilling fluid into a wellbore, comprising:
   introducing an invert emulsion oil-based drilling fluid formulation comprising an oil phase, an aqueous phase, a solid viscosifier that is an organophilic clay-based viscosifier, and a liquid viscosifier that is a polyhedral oligomeric silsesquioxane (POSS) downhole in the wellbore, and
   maintaining wellbore conditions such that the invert emulsion oil-based drilling fluid formulation provides a stable rheological property including one or more of viscosity, yield point, plastic viscosity, gel strength, and electrical stability for a period up to about 96 hours,
   wherein the wellbore comprises one or more high pressure, high temperature (HPHT) section including a pressure of greater than or equal to 10,000 psi, a temperature of greater than or equal to 150° C., or the pressure of greater than or equal to 10,000 psi and the temperature of greater than or equal to 150° C.

2. The method of claim 1, where the invert emulsion oil-based drilling fluid formulation further comprises one or more selected from the group consisting of a weighting agent, a friction reducer, a filtration control agent, an emulsion activator, a primary emulsifier, and a secondary emulsifier.

3. The method of claim 2, where the primary emulsifier comprises a fatty acid and a hydrocarbon.

4. The method of claim 2, where the primary emulsifier is a basic emulsifier.

5. The method of claim 1, where the viscosity relative to a shear rate is from 0.1 to 50 cP at 6 rpm.

6. The method of claim 1, where the yield point is in a range from 1 to 100 lb/100 ft$^2$.

7. The method of claim 1, where the plastic viscosity is in a range from 20 to 150 cP.

8. The method of claim 1, where the gel strength is in a range from 0.1 to 30 lb/100 ft$^2$.

9. The method of claim 1, where the electrical stability is in a range from 100 to 700 volts.

10. The method of claim 1, where the POSS is a glycidyl POSS.

11. The method of claim 1, where the oil phase includes an oleaginous fluid.

12. The method of claim 11, where the oleaginous fluid oil includes a dearomatized mineral oil.

13. The method of claim 12, where the dearomatized mineral oil is Safra oil.

14. The method of claim 1, where the aqueous phase is a calcium chloride anhydride-based brine.

15. The method of claim 1, where the solid viscosifier has a specific gravity of from 1 to 5.

16. The method of claim 1, where the solid viscosifier includes silica in an amount of from about 1 to 20 wt % of the total weight of the solid viscosifier.

17. The method of claim 1, where the solid viscosifier includes an amine.

18. The method of claim 17, where the amine is a bis(hydrogenated tallow alkyl)methylamine.

19. The method of claim 17, where a content of the amine in the solid viscosifier is a non-zero value up to about 1 wt % of the total weight of the solid viscosifier.

* * * * *